Aug. 6, 1929.  W. H. SAUVAGE  1,723,527
SLACK ADJUSTER
Filed May 17, 1924
Fig. 1.
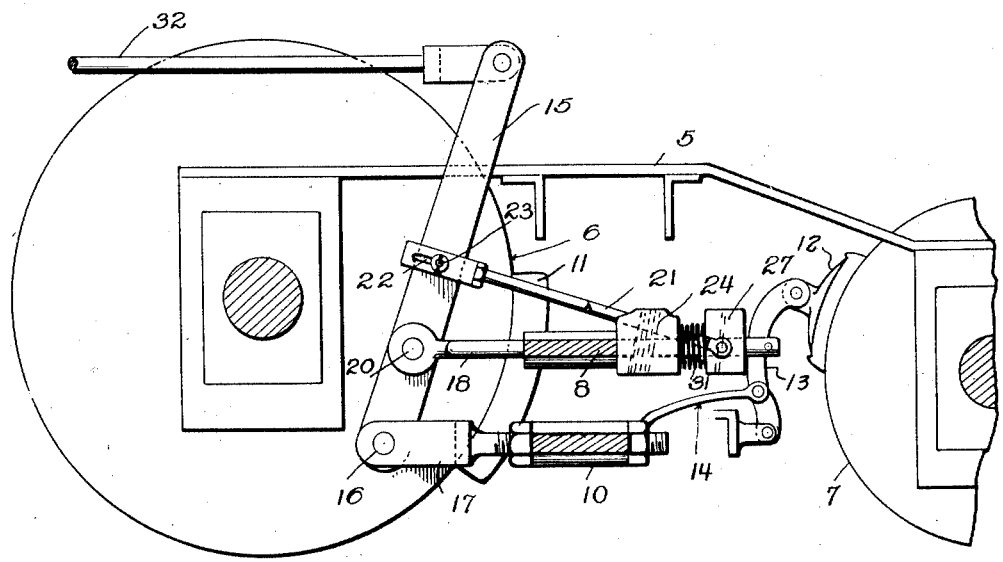
Fig. 2.
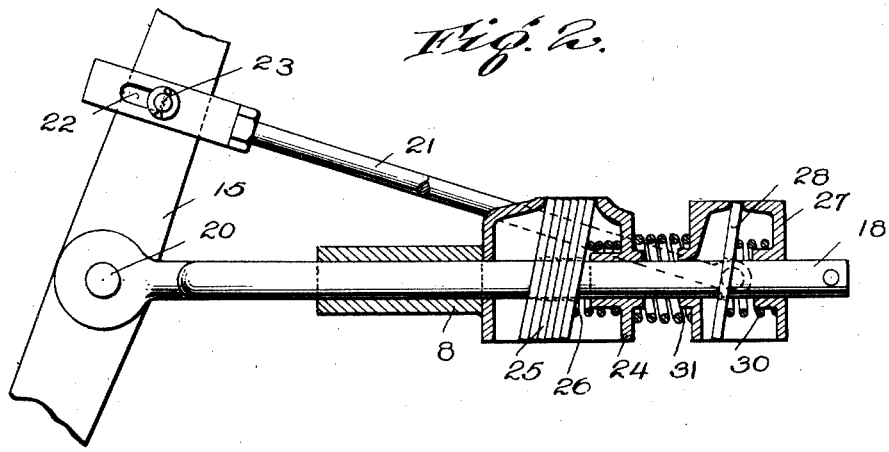
Fig. 3
Inventor
W. H. Sauvage
By
Attorney Patented Aug. 6, 1929.

1,723,527

UNITED STATES PATENT OFFICE.

WILLIAM H. SAUVAGE, OF NEW YORK, N. Y., ASSIGNOR, BY MESNE ASSIGNMENTS, TO THE GOULD COUPLER COMPANY, A CORPORATION OF MARYLAND.

SLACK ADJUSTER.

Application filed May 17, 1924. Serial No. 714,167.

This invention relates to improvements in slack adjusters and more particularly to slack adjusters especially applicable to that type of railway truck known as the Maximum traction truck although by suitable modification many features of the invention are applicable to other types of trucks, as will hereinafter appear. For convenience, however, the invention will be described with particular application to the specific type of truck as hereinafter set forth and is intended as an improvement over that construction illustrated and described in my prior Patent No. 1,117,707.

One of the objects of the present invention is to provide a more reliable and efficient slack adjuster for Maximum traction trucks having relatively few parts which may be inexpensively manufactured and assembled.

A further object is to provide a slack adjuster of the above type for application to a Maximum traction truck in which the usual dead lever is omitted and a relatively short brake shoe arm pivotally supported from the truck frame is substituted.

Other objects will be in part obvious from the annexed drawings and in part indicated in connection therewith by the following analysis of this invention.

This invention accordingly consists in the features of construction, combination of parts and in the unique relations of the members and the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as part of this disclosure, and in such drawings like characters of reference denote corresponding parts throughout all the views, in which,—

Figure 1 is a side elevational view of the adjuster partly in section with such parts of a Maximum truck as are necessary to understand the invention.

Figure 2 is a detail sectional view of the slack adjuster mechanism, and,

Figure 3 is a detail perspective view.

Referring now to the drawings in detail, 5 indicates the frame of the truck provided with the usual large wheels 6 and the smaller wheels 7. Brake beams 8 and 10 are positioned one above the other, the upper one 8 of which is provided with a brake shoe and head 11 co-acting with the wheel 6 while the wheel 7 is also provided with a brake shoe 12, carried by an inverted hanger 13 connected by a link 14 with the lower brake beam 10.

A live lever 15 is pivotally connected at its lower end 16 with the brake beam 10 by means of a rod 17. Likewise the brake beam 8 is connected by means of a take-up rod 18 with the point 20 and an adjusting rod 21 is loosely connected by means of lost motion slot 22 with a stud 23 on the live lever 15. The adjusting rod 18 passes through an eye or hole in the brake beam 8 as shown in Figure 3 as well as a housing 24, Figure 2, having a permanent take-up and holding means such as dogs 25 normally held in canted position by means of a spring 26. A second housing 27 is also positioned on the rod 18 containing one or more dogs 28 held in canted position by means of a spring 30. The adjusting rod 21 extends from the point 23 to this second housing which is separated from the first housing 24 by means of a spring 31. While I prefer to use take-up mechanisms as herein shown and described, it is, of course, to be understood that other types of holding mechanisms may be employed for the purpose of varying the effective length of the take-up rod 18.

The operation of this device is substantially as follows:—

On application of the brakes the upper end of the live lever 15 is moved relatively towards the left under the action of the pull rod 32 which causes the brake shoe 11 to move into engagement with the large wheel 6 and re-acts through the lower brake beam 10 and rod 17 to carry the brake shoe 12 into engagement with the smaller wheel 7. If excess travel occurs exceeding the lost motion provided for by means of a slot 22 then the adjusting rod 21 acting on housing 27 moves relatively towards the left to compress the spring 31 due to movement of the housing 27. The dog 28 is free to slide upon the rod 18 in that direction. On release of the parts the brakes return to normal position and the spring 31 expands to move the housing 27 towards the right an amount equal to the compression of the spring 31. The dog 28, however, exerts a biting engagement on the rod 18 when moved toward the right, thereby pulling this rod 18 in the direction in which the housing 27 now moves. The rod 18, however, is free to slide through the dogs 25 in this direction. Thus, the permanent take-up and holding means 25 contained within the housing 24 is operated to take up and hold the excess travel of the brake rigging.

It will thus be seen that the present invention provides a simple and practical mechanism particularly applicable to Maximum traction trucks. It is of a compact form, yet durable and reliable at all times.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of the invention, and, therefore, such adaptions should and are intended to be comprehended within the meaning and range of equivalency of the following claims.

What I claim is:—

1. In a brake system, in combination, brake beams positioned one above the other, a live lever connected adjacent its lower end with the lower beam and, at an intermediate portion, with the other of said beams, said second connection including a take-up rod movable with respect to said beam, two relatively movable take-up devices acting upon said rod, means for moving one of said devices with respect to the other on excess travel of the brakes, and means for moving the other of said devices with respect to said take-up rod on release of said brakes whereby such travel is first temporarily and then permanently taken up.

2. In a brake system, in combination, brake beams located one above the other, a live lever, slack adjuster mechanism connected with said live lever and including a take-up rod associated with one of said brake beams, a take-up device associated with said take-up rod, a second take-up device movable relatively thereto, a spring separating said take-up devices and normally maintaining them in predetermined relation, and an adjusting rod connected with the live lever and one of said take-up devices for moving the same relatively to the other on application of the brakes upon excess travel thereof to temporarily take up such excess travel, said separating spring acting to restore the parts to normal position upon release of the brakes and permanently take up and hold said excess travel.

3. In a brake system, in combination, brake beams positioned one above the other, a live lever, slack adjuster mechanism connected with said live lever and including a housing containing take-up means associated with one of said brake beams, a second housing containing take-up means movable relatively thereto, both of said housings being associated with a take-up rod connected to the live lever, a spring mounted on said rod and separating said housings, said spring normally maintaining said housings in predetermined relation, and an adjusting rod connected with the live lever and one of said housings for moving the same relatively to the other on application of the brakes on excess travel to temporarily take up such excess travel, said separating spring acting to restore the parts to normal position upon release of the brakes and permanently take up and hold the excess travel, said adjusting rod having a connection with the live lever permitting a predetermined amount of lost motion to prevent actuation of the connected housing until excess travel occurs.

4. In a brake system, in combination, a brake beam, a take-up rod slidably mounted with respect thereto, take-up devices slidably mounted on said rod including permanent take-up means and temporary take-up means, said permanent take-up means engaging said brake beam, a spring separating said take-up means, and an adjusting rod connected with said temporary take-up means and said live lever whereby the spring is compressed on excess travel of the brakes and expands to move the take-up rod with respect to the brake beam and permanently take up and hold said excess travel when the brakes are released.

5. In a brake system, in combination, a plurality of brake beams, a live lever connected adjacent its lower end with one of said beams and at an intermediate portion adjustably connected with the other of said brake beams by means of a take-up rod, two relatively movable housings containing take-up means mounted on said take-up rod, one of said housings engaging said brake beam to determine the relative position of said beam and rod, means for moving the other of said housings with respect to the first on excess travel of the brakes, and means for moving said first housing on the take-up rod upon release of the brakes whereby excess brake travel is first temporarily and then permanently taken up.

In witness whereof I have hereunto set my hand.

WILLIAM H. SAUVAGE.